(12) United States Patent
Lasseter

(10) Patent No.: US 6,309,146 B1
(45) Date of Patent: Oct. 30, 2001

(54) FIXTURE FOR DRILLING LONG HOLES IN DOORS

(76) Inventor: Ronald E. Lasseter, 6936 NW. 72 nd Ave., Miami, FL (US) 33166

(*) Notice: Subject to any disclaimer, the term of this patent is extended or adjusted under 35 U.S.C. 154(b) by 0 days.

(21) Appl. No.: 09/624,463

(22) Filed: Jul. 24, 2000

(51) Int. Cl.$^7$ .................................................. B23B 41/00
(52) U.S. Cl. .................... 408/1 R; 408/108; 408/115 R; 408/705
(58) Field of Search ............................. 408/1 R, 97, 103, 408/108, 115 R, 705

(56) References Cited

U.S. PATENT DOCUMENTS

| | | | |
|---|---|---|---|
| 3,637,318 | * | 1/1972 | Hayes ....................................... 408/11 |
| 3,707,332 | * | 12/1972 | Wolf ........................................ 408/705 |
| 3,999,880 | | 12/1976 | Shabtai . |
| 4,865,496 | | 9/1989 | Challis . |
| 5,018,912 | * | 5/1991 | Reitz ................................. 408/115 R |
| 5,046,901 | * | 9/1991 | Taylor .................................. 408/108 |
| 5,791,834 | | 8/1998 | Zehrung . |
| 5,947,656 | | 9/1999 | Simson . |
| 6,217,266 | * | 4/2001 | Bowling ........................... 408/115 R |

OTHER PUBLICATIONS

Dor–Cor™ Drill Fixture Catalog From Marray Enterprises, Inc. Santa Clara, CA 95050.

* cited by examiner

Primary Examiner—Daniel W. Howell
(74) Attorney, Agent, or Firm—Alvin S. Blum

(57) ABSTRACT

A door drilling fixture is provided for drilling a long straight hole in a door from the hinge edge of the door to a through aperture of the door adjacent the latch edge of the door. The hole is for passing wires from the hinge edge to a device such as an electric lock in the aperture. The fixture ensures that the hole will run parallel to a broad face of the door by clamping to the door face at the hinge edge and at the aperture. The fixture includes an elongate body with a planar, non-marring bearing surface for clamping tightly against the broad face of the door. A set of drill bushings aligned along a drill axis parallel to, and spaced apart a fixed distance from, the bearing surface is mounted at one end of the body. A clamp assembly for clamping to the hinge edge is attached to the fixture adjacent the drill bushings. A second clamp assembly attached to the other end of the body passes through the aperture. It is connected to the body by an elongate slot to adjust for the distance between the hinge edge and the aperture.

7 Claims, 3 Drawing Sheets

FIXTURE FOR DRILLING LONG HOLES IN DOORS

BACKGROUND OF THE INVENTION

This invention relates to jigs or fixtures and more particularly to a fixture for accurately guiding a drill for drilling a long hole through a door from the hinge edge to the lock opening.

DESCRIPTION OF THE PRIOR ART

It is often necessary to provide electrical connection to an electric device such as a card reader or electric lock that is mounted in an aperture near the latch edge of a door. The electric wires pass through a long hole in the door and exit at the hinge edge of the door. The hole to receive the wires is often 3/8 inches in diameter and 3 feet long. To drill such a hole accurately, drill guides, or fixtures, such as those described in U.S. Pat. No. 5,791,834 issued Aug. 11, 1998 to Zehrung, have been developed. They clamp on the hinge edge of the door and hold the drill guiding bushings parallel to a face of the door at the edge. The Zehrung improvement allows the angle of the drill relative to the door edge to be adjusted to ensure that the drill will correctly arrive at its destination at the aperture at the other edge of the door. However, if the face of the door at that edge is not parallel to the desired path because of ornamentation or if the door is warped, the drill may not arrive at the center of the aperture and correctly positioned between the broad faces of the door.

SUMMARY OF THE INVENTION

It is accordingly an object of the invention to provide a drill guiding fixture that will ensure that the drill will travel accurately from the entrance point at the hinge edge to its destination at the lock aperture independent of warping or irregularities of the door face at the hinge edge. The fixture of the invention has an elongate body with an edge clamp at a first end and an aperture clamp at a second end. The edge clamp clamps to the hinge edge to locate the entrance of the hole. The aperture clamp clamps though the aperture cut in the door for mounting the electric device at the latch edge of the door. The two clamps draw the body tightly against one broad face of the door. Drill guide bushings mounted on the body are aligned along an axis extending from the first end of the body toward the second end, parallel to the long axis of the body, and spaced apart from that axis by a fixed distance. This ensures that the drill will travel along a path parallel to the broad face that will arrive exactly at the destination, and also that irregularities at the door face at the hinge edge will not alter the drill path.

These and other objects, features, and advantages of the invention will become more apparent when the detailed description is studied in conjunction with the drawings in which like elements are designated by like reference characters in the various drawing figures.

DETAILED DESCRIPTION OF PREFERRED EMBODIMENTS

Figure 1:
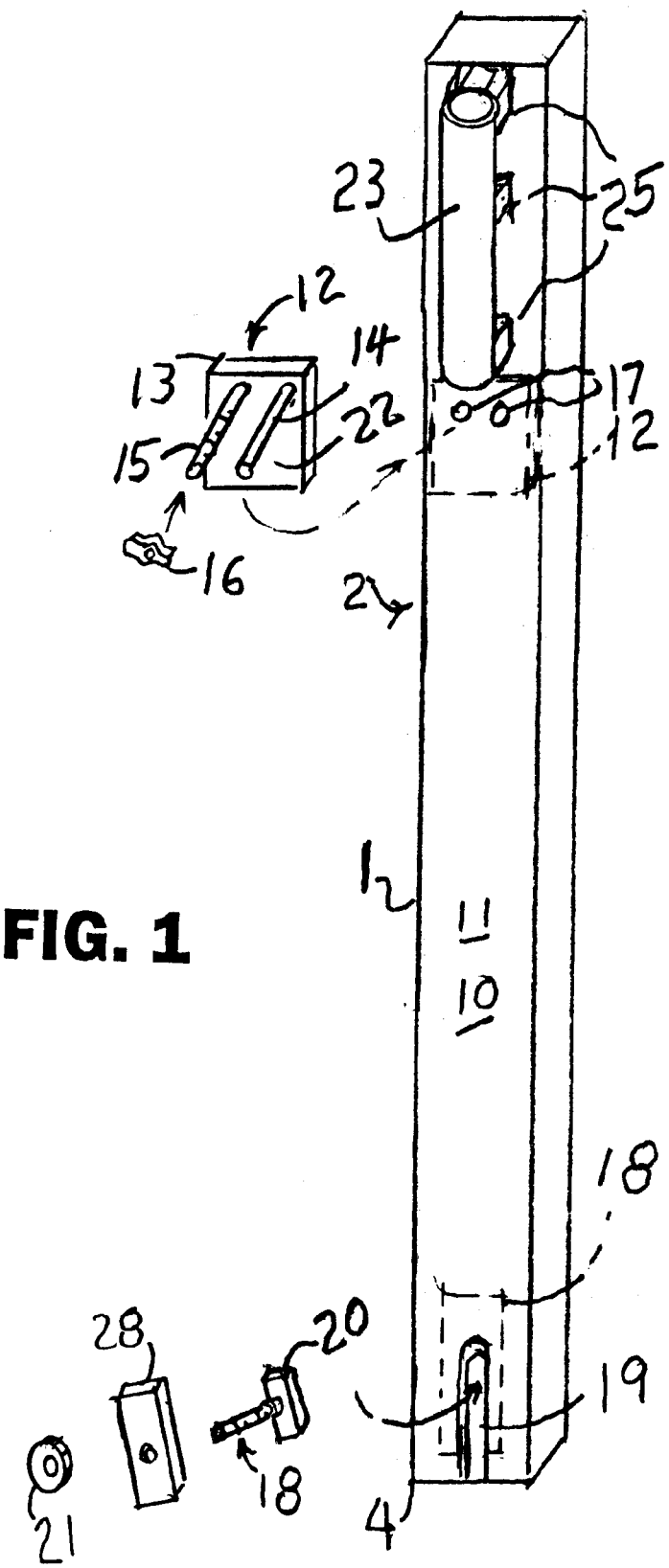
FIG. 1 is an exploded perspective view of the fixture of the invention.
Figure 2:
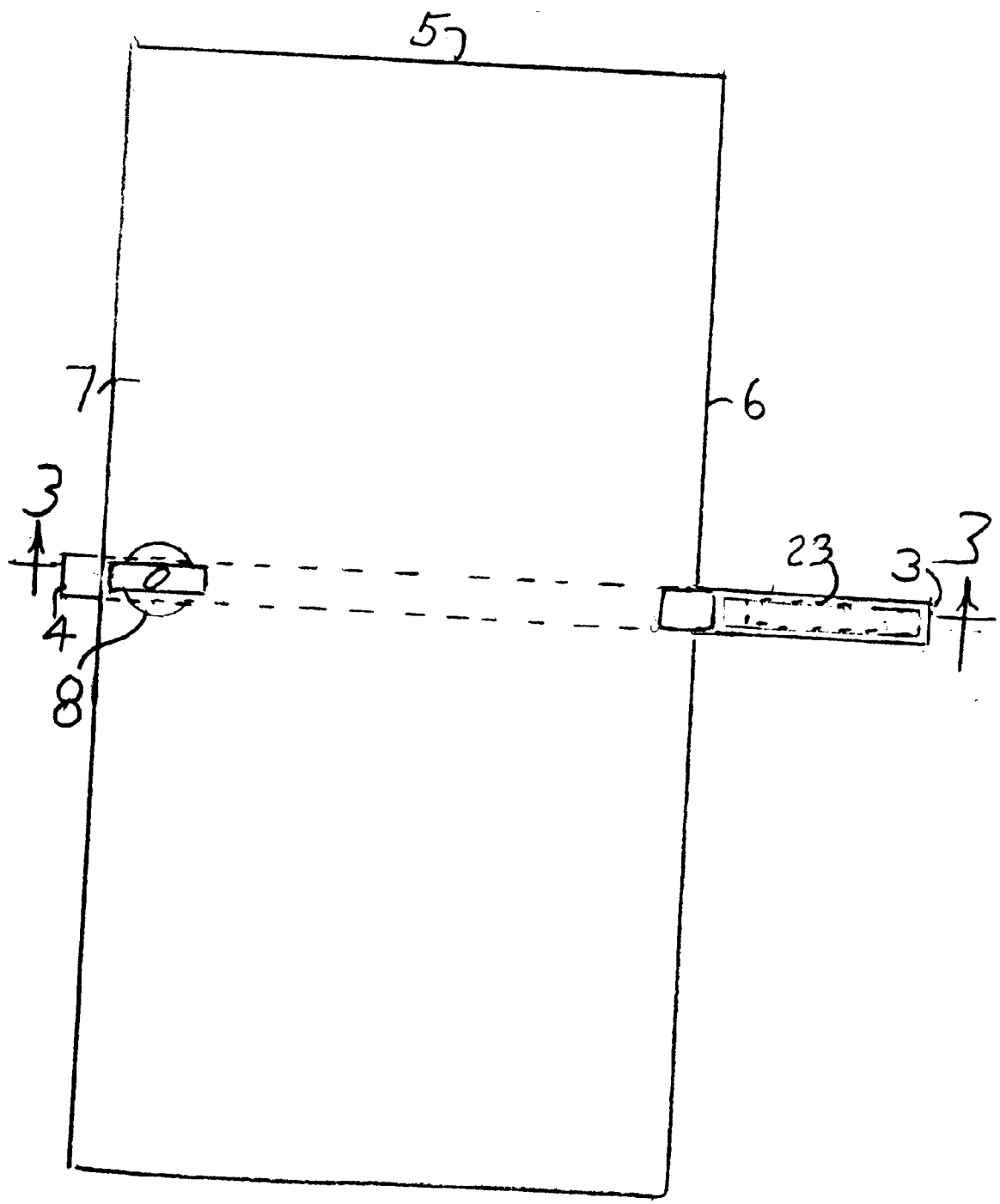
FIG. 2 is a rear elevation view of the invention mounted on a door.
Figure 3:
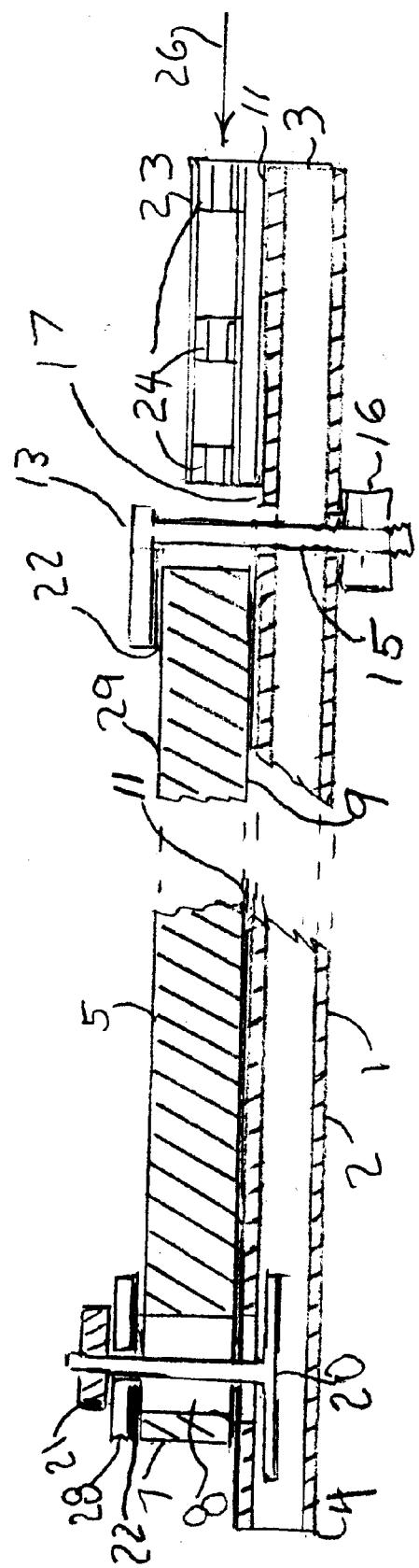
FIG. 3 is a sectional view through line 3—3 of FIG. 2.

Referring now to the drawings of FIGS. 1–3, a door 5 has a latch edge 7, and a hinge edge 6. To the hinge edge will be applied a special hinge carrying wires to be passed from the hinge edge, through a hole to be drilled parallel to a broad face 9 of the door, and to a through aperture 8 adjacent the latch edge that will hold the electric lock, or other device to be mounted in the aperture 8. A fixture 2 for guiding an elongate drill to accurately drill this hole is clamped to the door 5, and the drill is guided along the desired path by drill bushings 24 well known in the art. It is most important that the drilled hole follow a precise path through the door, because the fire rating of the door will be impaired if the hole comes too close to either door face.

The fixture 2 of the invention comprises:

An elongate rigid body 1 having a long axis, a first end 3, a second end 4, and a bearing face 10, provided with a non-marring, planar surface 11 for bearing against the broad face 9 of the door 5 to precisely determine the drill path.

A plurality of drill bushings 24 are mounted at the first end 3 in bushing tube 23 and aligned along a drill axis 26 parallel to the bearing face 10, and spaced apart by rigid mounting means 25 from the bearing face by a fixed distance.

A first clamp assembly 12 attached to the first end at a site past the drill bushings toward the second end, is constructed for clamping to the hinge edge to draw the bearing face against the broad face. It includes a plate 13, to which are fixed two parallel posts, a smooth post 14, and a threaded post 15. The body is provided with through holes 17 through which the posts freely pass. A threaded knob 16 on post 15 draws the body tightly against the broad face of the door at the hinge edge 6.

A second clamp assembly 18 is connected to the body adjacent the second end 4. It is constructed for clamping the door through the aperture to draw the bearing face against the broad face 9 of the door at the latch edge 7. It is constructed to slide on the body to adjust for the distance between the hinge edge and the aperture. Second clamp assembly 18 includes a perforated plate 28 with a non-marring surface 22 to be pressed against the broad face 29. A T-headed bolt 20 passes through the plate 28 and is threadedly engaged by large nut 21, while the T-head is received in the body through slot 19.

The bearing face of the body being forced against the broad face of the door at both of its ends 3 and 4 precisely defines the position of the drill axis 26 parallel to the broad face and ensures that the path of the drill will reach its exact destination.

Figure 4:
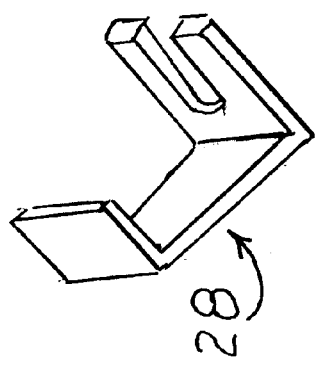
FIG. 4 is a perspective view of a door thickness adapter for use with doors of lesser thickness.

The fixture positions the drill bushings and the drill axis at a fixed distance from the door face. When it is desired to position the drill axis closer to the broad face 9, such as for a thinner door, shims such as generally U-shaped adapters 28, shown in FIG. 4, may be slipped over the hinge and latch ends of the door before applying the clamps.

The above disclosed invention has a number of particular features which should preferably be employed in combination, although each is useful separately without departure from the scope of the invention. While I have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. For drilling a long hole from a hinge edge of a door to the aperture at a latch edge that is to receive electric wires, a drill guiding fixture comprising:

a) an elongate rigid body having a long axis, a first end, a second end, and a bearing face provided with a non-marring surface for bearing against a broad face of the door;
b) a plurality of drill bushings mounted at the first end and aligned along a drill axis parallel to the bearing face, and spaced apart from the bearing face by a fixed distance;
c) a first clamp assembly affixed to the first end at a site past the drill bushings toward the second end, and constructed for clamping to the hinge edge to draw the bearing face against the broad face;
d) a second clamp assembly connected to the body adjacent the second end, and constructed for clamping the door through the aperture to draw the bearing face against the broad face, and being slidable on the body to adjust for the distance between the hinge edge and the aperture; and
e) wherein the bearing face of the body forced against the broad face of the door at both of its ends defines the position of the drill axis and the path of the drill through the door.

2. The fixture according to claim 1, in which the first and second clamp assemblies are provided with non-marring surfaces.

3. The fixture according to claim 1, further comprising shims for mounting on the hinge and latch edges beneath the clamps to reduce the distance between the broad face and the drill axis for use with thinner doors.

4. For a door having a hinge edge, an opposed latch edge, a broad face connecting the hinge and latch edges, and an aperture through the broad face adjacent the latch edge, a drill guiding fixture for drilling a long hole from the hinge edge, parallel to the broad face, to the aperture, the drill guiding fixture comprising:

a) an elongate rigid body having a long axis, a first end, a second end, and a bearing face provided with a non-marring, planar surface for bearing against the broad face of the door to determine the drill path;
b) a plurality of drill bushings mounted at the first end and aligned along a drill axis parallel to the bearing face, and spaced apart from the bearing face by a fixed distance;
c) a first clamp assembly affixed to the first end at a site past the drill bushings toward the second end, and constructed for clamping to the hinge edge to draw the bearing face against the broad face;
d) a second clamp assembly connected to the body adjacent the second end, and constructed for clamping the door through the aperture to draw the bearing face against the broad face, and being slidable on the body to adjust for the distance between the hinge edge and the aperture; and
e) wherein the bearing face of the body being forced against the broad face of the door at both of its ends defines the position of the drill axis parallel to the broad face and the path of the drill through the door.

5. The drill guiding fixture according to claim 4, in which the first and second clamp assemblies are provided with non-marring surfaces.

6. The fixture according to claim 5, further comprising shims for mounting on the hinge and latch edges beneath the clamps to reduce the distance between the broad face and the drill axis for use with thinner doors.

7. A method for drilling a long hole from a hinge edge of a door along a path parallel to a broad face of the door to an aperture through the broad face adjacent a latch edge of the door, the method comprising:

a) providing a drill guiding fixture with an elongate rigid body having a long axis, a first end, a second end, and a bearing face provided with a non-marring, planar surface for bearing against the broad face of the door to determine the drill path, and a plurality of drill bushings mounted at the first end and aligned along a drill axis parallel to the bearing face, and spaced apart from the bearing face by a fixed distance;
b) clamping the body to the broad face at the hinge end with a first clamp assembly affixed to the first end at a site past the drill bushings toward the second end;
c) clamping the body to the broad face through the aperture with a second clamp assembly connected to the body adjacent the second end, that is slidable on the body to adjust for the distance between the hinge edge and the aperture; and
d) drilling the hole with an elongate drill passing through the guide bushings and into the door.

* * * * *